(No Model.)
H. MULLEN & J. NOBLE, Jr.
WHIP CORE.
No. 315,653. Patented Apr. 14, 1885.
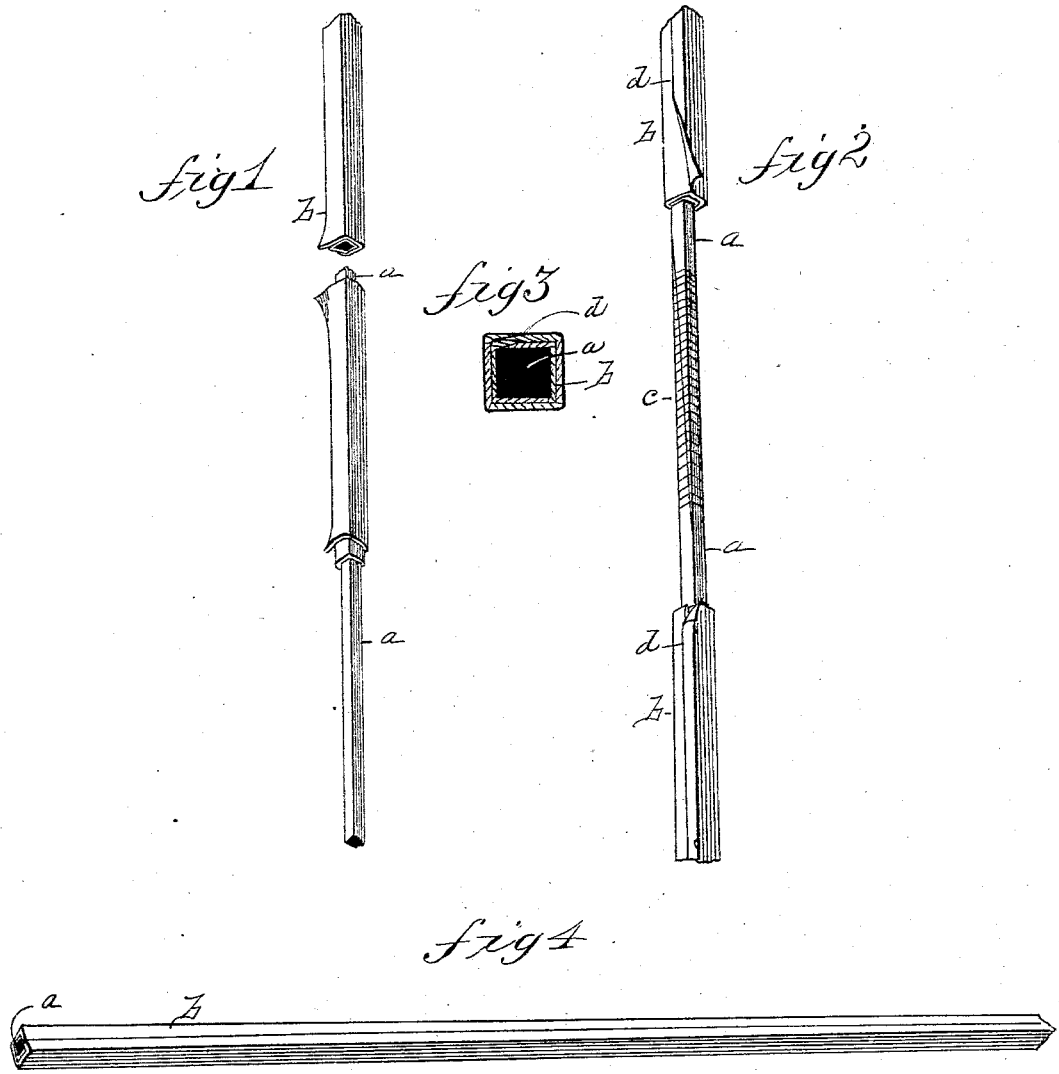

UNITED STATES PATENT OFFICE.

HENRY MULLEN AND JAMES NOBLE, JR., OF WESTFIELD, MASSACHUSETTS.

WHIP-CORE.

SPECIFICATION forming part of Letters Patent No. 315,653, dated April 14, 1885.

Application filed January 22, 1885. (No model.)

*To all whom it may concern:*

Be it known that we, HENRY MULLEN and JAMES NOBLE, Jr., citizens of the United States, residing at Westfield, in the county of Hampden and State of Massachusetts, have jointly invented new and useful Improvements in Whip-Cores, of which the following is a specification.

This invention relates to improvements in whip-cores, the object being to provide a compound core embodying in its construction whalebone and other similar material of less value than the bone, whereby the latter is made more serviceable than heretofore, and to provide means for utilizing parts of whalebone heretofore considered unserviceable for making whips.

In the drawings forming part of this specification Fig. 1 is a view of two sections of a core, one of which is fully and the other partly wound. Fig. 2 shows a core having its two ends wound, and showing at its central part the covering broken away or removed, thereby showing the spliced bone interior. Fig. 3 is a cross-section of the completed core, and Fig. 4 is a perspective view of the completed core.

In the drawings, $a$ represents pieces of whalebone, square in cross-section, of the kind and dimensions ordinarily used by whip-makers; and $b$ represents a covering for the bone $a$, of rawhide, or of leather having similar qualities.

Many efforts have been made to discover a substitute for whalebone in the manufacture of whips, but without a satisfactory result, as no material has yet been discovered which possesses the peculiar characteristics of great flexibility and toughness which are found combined in bone; and the object of this invention is to supplement bone with another similar material, whereby a greatly-improved whip-core is produced and the bone qualities above named are preserved.

In carrying our invention into effect we take a piece of whalebone, $a$, of a continuous piece, if of sufficient length, and having prepared a strip of rawhide, $b$, by "scarfing" its edges and properly softening it, we apply cement to the bone and to the rawhide, and wrap the latter closely around the bone $a$, lapping the outer thin edge of the leather closely upon the exterior surface, forming a joint at $d$ extending nearly in a straight line from one end of the core to the other, as shown. By carefully wrapping the rawhide the square form of the bone is preserved in the finished core, ready to have the usual rattan sidings laid thereon to make a whip.

If desired, the core may be made round by employing bone of that form.

The lots of whalebone usually received at a whip-manufactory contain many short pieces, and those that are imperfect from an inclination of the fibers thereof to separate. The aforesaid short pieces of bone lack the requisite length to be useful singly, and when spliced by simply cementing and winding their ends their union is not durable nor strong; but by uniting said pieces, as shown at $c$, Fig. 2, by lapping, cementing, and winding their joined ends, and then cementing a rawhide wrapping, $b$, around them in the manner above described a core is produced after the cement becomes dried of practically the same quality as though the bone $a$ were continuous.

Pieces of bone in which the fibers incline to separate, as aforesaid, and split off, when wrapped with rawhide, as stated, constitute a durable and as useful bone filling for the core as the more perfect pieces, for it will be seen that when the bone and rawhide are completely solidified by cementing, wrapping, and drying, the parts are practically homogeneous, and spring and act together, the rawhide itself being strong and flexible, and perfectly supporting the inclosed bone, and preventing it from being broken by hard usage.

It will be observed that the strip of rawhide $a$ is to be of about the length of the piece of bone to be wrapped therein and of a width sufficient to form about two thicknesses on each side of the bone, as shown in Fig. 3.

What we claim as our invention is—

An improved compound whip-core, substantially as described, composed of whalebone, rawhide, and a suitable cement for the latter, the bone constituting the center of the core and the rawhide the covering thereof, said covering being cemented upon and wrapped around said bone, the outer edge thereof being lapped and cemented upon the covering, substantially as set forth.

HENRY MULLEN.
JAMES NOBLE, JR.

Witnesses:
H. C. CHAPIN,
J. D. GARFIELD.